Aug. 12, 1941.  P. KREMER  2,252,263
METHOD AND ARRANGEMENT FOR THE TRANSMISSION OF IMAGES
Filed March 31, 1939  2 Sheets-Sheet 1
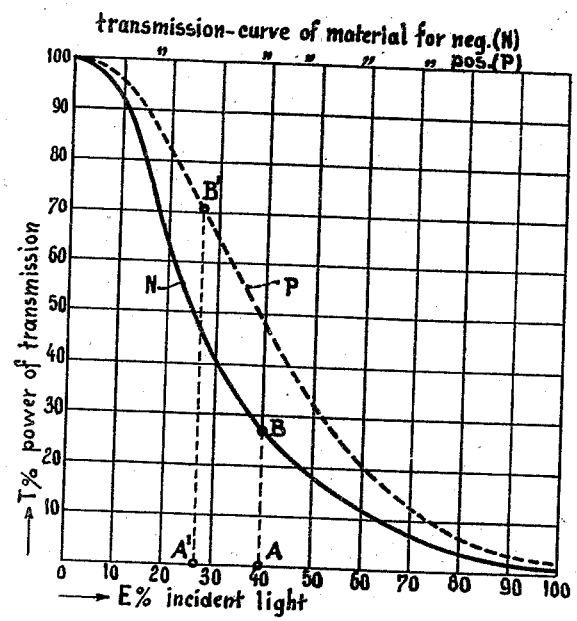
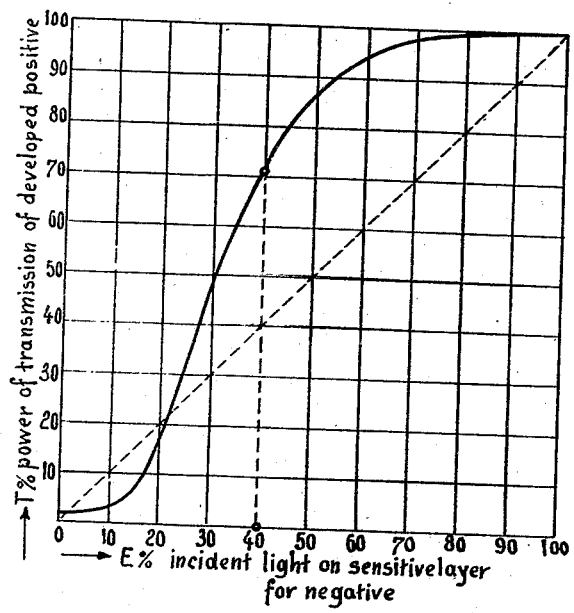
INVENTOR
PIETER KREMER Aug. 12, 1941.  P. KREMER  2,252,263
METHOD AND ARRANGEMENT FOR THE TRANSMISSION OF IMAGES
Filed March 31, 1939  2 Sheets-Sheet 2
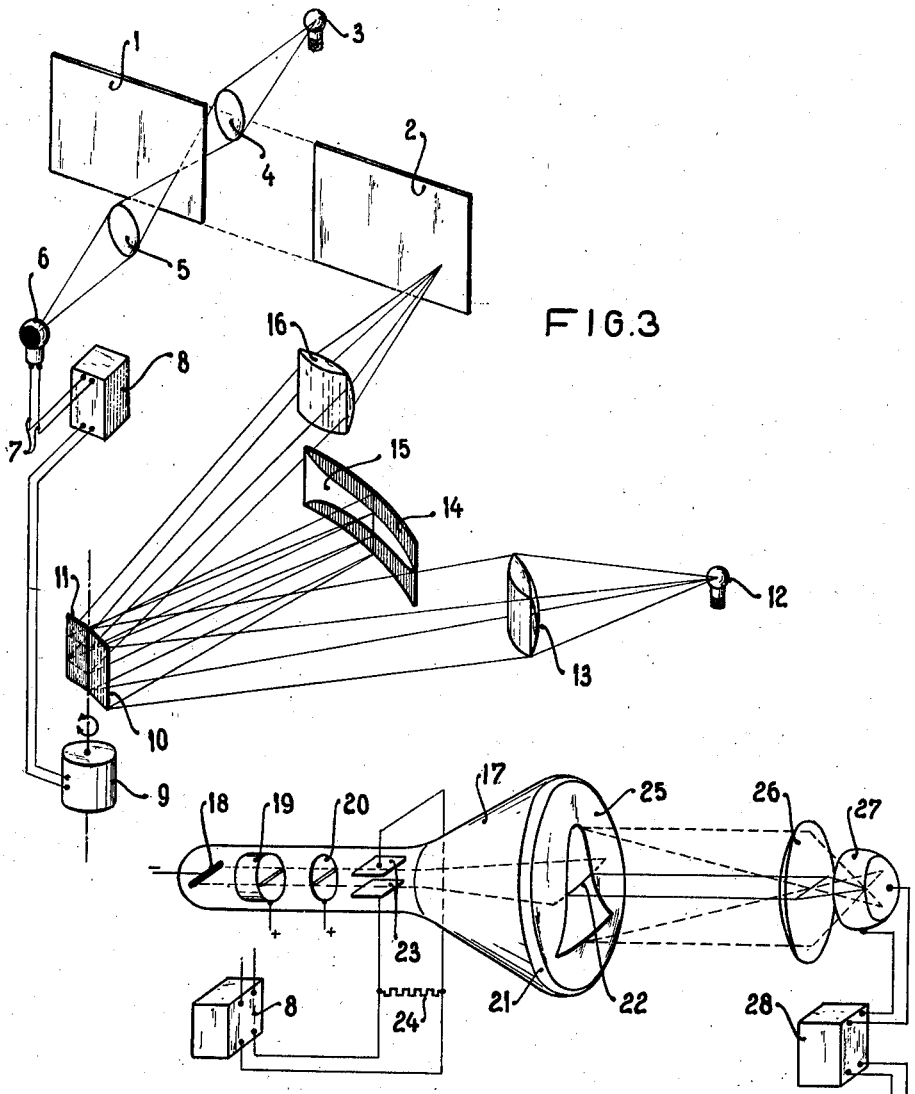
FIG.3
FIG.4
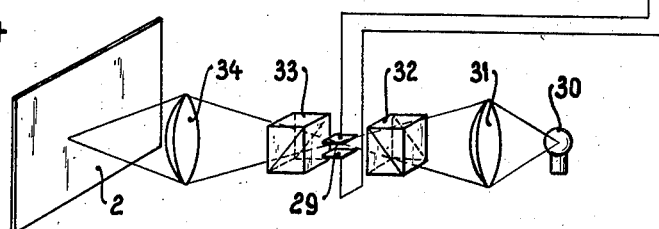
INVENTOR
PIETER KREMER Patented Aug. 12, 1941

2,252,263

UNITED STATES PATENT OFFICE 2,252,263

METHOD AND ARRANGEMENT FOR THE TRANSMISSION OF IMAGES

Pieter Kremer, Bilthoven, Netherlands

Application March 31, 1939, Serial No. 265,340
In Great Britain April 12, 1938

12 Claims. (Cl. 178—5.2)

This invention relates to a method and arrangement for the transmission of images and in particular for the reproduction of images in colors.

My invention will be better understood by reference to the following specification and the accompanying drawings, wherein Fig. 1 illustrates the principle of my invention, and is the characteristic transmission curve of a photographically sensitive layer, showing the relation between the quantity of light transmitted after development and the quantity of light originally incident on the unexposed layer.

Fig. 2 is the composite photographic characteristic curve of a negative and a positive printed from the developed negative, showing the relation between the quantity of light transmitted by the developed positive and the quantity of light originally incident on the unexposed negative.

Fig. 3 shows an embodiment of my invention employing an electro-mechanical oscillograph and a reflecting mirror mask.

Fig. 4 shows another embodiment of my invention employing a cathode-ray oscillograph, and an electro-optical Kerr cell translating means, together with a mask adjacent the screen of the cathode-ray oscillograph.

For the sake of clearness I have thought it desirable to provide a few definitions of the terms used in the following specification. The "power of transmission" hereinafter referred to means the ratio of the amount of light transmitted by a body to the amount of light incident upon it, see, for example, J. W. F. Walsh, Photometry, 1926, page 463. By "transmission curve" is meant the graph representing in a rectangular system of coordinates ($xy$) the power of transmission after development of a photographic sensitive layer, as a function ($y$) of the amount of light ($x$) incident on the sensitive layer before development.

In order to be able to draw these curves, one must first decide upon the amount of incident light ($x$) to be put equal to 100%. It will suffice in this connection to consider one of three primary colors for the rendering of an object, say red.

The intensity of 100% of this incident light ($x$) is then determined as the amount of red light for which upon exposure of the sensitive layer and subsequent development (the conditions of exposure and development being exactly the same in every respect as those prevailing in the actual process) the resulting opacity of the developed layer shall be such that to all intents and purposes an amount of red light which is substantially zero is transmitted through the developed layer when an amount of red light of this same value ($x$) is incident on the developed layer.

One of the difficulties encountered in the reproduction of an object in its true colors is the fact that owing to the character of photographic materials the powers of transmission, in various points of a positive transparency, produced from a negative of the object to be reproduced are not proportional to the amounts of light incident upon the corresponding points of the negative during the exposure, in other words, that the graph representing in a rectangular system of coordinates the relation between the powers of transmission of the positive transparency and the amount of light incident upon the negative material during the original exposure, is not a straight line, passing through the origin of the coordinates, but a curve.

Let the transmission-curves of the photographic material for the negative and the positive be given in Fig. 1 of the accompanying drawings by N and P respectively. Consider a point of the image or object to be reproduced, emitting to the camera, say, 40% of red (the 100% being determined as above). Upon development the negative will possess at the corresponding point a power of transmission of 27%, Fig. 1, AB. When, next, a positive transparency is made from that negative by contact exposure or by projection (the negative being uniformly illuminated and the intensity of the illumination being again 100%), the amount of light incident on the material for the positive will be 27%, so that upon development the positive transparency will possess at the corresponding point a power of transmission of 71%, Fig. 1, A'B'. Preceeding in the same way for other values of the incident light the relation between the power of transmission of the positive transparency and the amount of light incident on the sensitive material for the negative, is readily obtained. The result is shown in Fig. 2.

If now the amount of red contained in the color of two points of the object is, say 20% and 40% respectively, the corresponding points of the positive transparency for red will possess powers of transmission equal to 16.5% and 71% respectively (see Fig. 2). The ratio of the red-contents which for the two points of the object is 2, is, therefore, altered in the projection through the positive transparency into 4.3; similar considerations hold for green and blue, and it will be clear that a faithful rendering of the colors of the object is, in this way, impossible to attain.

Only when the ratio of the red-contents of any two points of the object (and the same is true for green and blue) is reproduced unaltered on projection through the positive transparency, will it be possible to bring about a correct rendering of the colors of the object and only if the graph of Fig. 2 is a straight line through the origin will that condition be fulfilled, showing the transmission characteristic of the positive transparency.

The present invention is intended in the first place to provide the means for the practically complete fulfillment of this condition. Its main characteristic is that from a first negative is made either a new (second) negative or a positive, not directly but in a roundabout way, which I shall now described. That is, transfer printing is accomplished not by direct contact printing or by an ordinary optical transfer printer, but by an electrical translating method.

The first negative is not reproduced simultaneously as a whole but is scanned by a beam of light of which the transmitted part is made to fall on a photo-electric cell. The varying energies of the resulting instantaneous photo-currents (amplified if necessary) are made to correspond to energies of predetermined adjusted values by means of a regulating arrangement adjusted in such a way to the transmission-curves of the photographic material used in the process in question that the graph mentioned above of the transmission characteristic of the resultant positive actually is or approximates to a straight line.

The regulating arrangement in question (the "adjuster") can be constructed in various ways.

If the time required for the reproduction is only of secondary importance as, for example, when reproducing a single picture or only a few pictures or colored photographic images, the adjuster can be an oscillograph controlled by the photo-electric cell and of which the mirror reflects during the scanning a bundle of rays from a fixed light-source towards different points of a screen or mask. This screen or mask lets through or reflects at these points amounts of light which are adjusted to the transmission-curves mentioned above and, if desired, to still other characteristics, as described below.

If, however, the time required for the scanning is of primary importance as, for example, when cinematographic films, obtained after exposure through color-filters must be reproduced, so that a very great number of images must be scanned separately, one can use as an adjuster a Braun tube which operates practically speaking without any retardation. In this tube a flat bundle of electronic rays is shot off from the cathode. By means of an electric or a magnetic field, controlled by the photo-electric cell, this bundle is deviated to different degrees so that it hits a fluorescent screen at different places. The amounts of light emitted at these places similarly to the amounts of light let through or reflected by the mask or screen operating in connection with the oscillograph, are again adjusted to the transmission-curves of the photograph material used and, if desired, to still other characteristics, as described below.

The light-energy emerging from the adjuster is then used either directly or indirectly for the scanning-exposure of the transparency-material. After development this will satisfy the condition that the resultant powers of transmission of the different points of the developed transparency shall be in the same ratios to each other as the energies incident on the original undeveloped sensitive layer in its corresponding points during the original exposure. Since one can regulate entirely at will the amount of light that shall be let through or reflected (when an oscillograph is used) or that shall be emitted (when a Braun tube is used) in any point or along any line of the screens mentioned, it will be clear that one can completely compensate the "faults" of the negative as well as of the positive material, so that in this way a faithful reproduction as regards colours can be obtained of any object.

The scanning of the negative and the corresponding scanning-exposure for the reproduction need not, of course, be performed at the same laboratory, or station, for the light-impulses, after transformation into photo-current variations, can also be transmitted by cable or by wireless. The invention can then also be used for the transmission of uncolored images. Since in this case the requirements as to the black and white gradations are, generally speaking, less rigorous, one can suffice with a less accurate adjustment to the transmission-curves of the amounts of light let through or reflected (oscillator) or emitted (Braun tube).

In order to describe and explain the invention I show in Fig. 3 of the accompanying drawings the schematic arrangement of an oscillograph-adjuster for obtaining a reproduction in colors according to the present invention, while Fig. 4 shows the schematic arrangement of the Braun-tube-adjuster for the same purpose.

In the arrangement of Fig. 3 for the reproduction of a negative obtained on exposure through a color-filter, 1 represents the negative in question, 2 the sensitive layer on which a corrected reproduction of this negative is to be made. The simultaneous motion of both is regulated in such a way that corresponding points are scanned at the same moment and that all points are scanned successively. A sharp image of the source 3 is formed by means of the lens 4 in a point of the negative, the transmitted light is concentrated by means of the lens 5 on a photo-electric cell 6. The motion of the negative 1 gives rise to variations in the intensity of the transmitted light and this varying light, in falling on the photo-electric cell causes the photo-current to vary accordingly. After amplification, if necessary, by the amplifier 8 (in itself a well-known way of proceeding) the current passes through the electrical part 9 of an oscillograph. The latter is equipped with two small mirrors 10 and 11, which meet at a small angle in their common axis of rotation. The source 12 emits light, which by means of a sphero-cylindrical lens 13 forms, after reflection by the mirror 10, a line-shaped image on the screen 14, which is curved cylindrically round the axis of rotation of the mirrors 10 and 11. Only part of this screen is made reflecting in such a way, that the reflected part of the rays falls on the mirror 11. The remaining part of the screen can be made either non-reflecting or reflecting in other directions. By means of the sphero-cylindrical lens 16 the reflected ray is concentrated on a point of the sensitive layer 2, on which the corrected reproduction is to be impressed. The exposure of that point will now depend on the transmissive power of the corresponding point in the negative 1 and on the shape of the reflecting part 15 of the screen 14.

Fig. 4 shows the arrangement when a Braun-tube-adjuster is used. In the Braun tube 17, where 18 represents the cathode and 19 the anode, a bundle of electrons of constant strength and line-shaped cross-section, impinges, after passing through the diaphragm 20, on a fluorescent screen 21, producing thereby the light-emitting line 22. The tube 17 is further equipped with a set of plates 23, by which the bundle can be deflected perpendicularly to its plane, so that also the line 22 can be displaced, parallel to itself at right angles to its length-direction. The plates 23 are connected with the terminals of a resistance 24, through which, after amplification, the currents produced, for example, by means of an arrangement 1—8 in Fig. 3, are made to flow. The current-variations in 24 cause the voltage between the plates 23 and, therefore, also the place of the light-line 22 on the screen 21 to vary accordingly.

The light-line 22 serves as a source of adjusted light, which is concentrated through a mask 25 by means of the lens 26 on the photoelectric cell 27. The varying photo-currents are amplified by means of the amplifier 28 (in itself known already) and are then used to produce voltage variations between the electrodes 29 of a Kerr-cell, which are connected with 28. The Kerr-cell forms part of an electrical-optical system (in itself already known) consisting of a lamp 30, the lens 31, the Nicol 32, the Kerr-cell 29, the Nicol 33 and the lens 34 arranged in such a way, that the light from the lamp 30, transmitted through the Nicols and controlled by the Kerr-cell, is concentrated in a point of the sensitive layer 2, on which one wishes to obtain a corrected reproduction of the image 1 (see Fig. 3).

In this way the exposure of any point of sensitive layer 2 is made to depend on the amount of light, received by the photo-electric cell 27, and this amount is for a given value of intensity of the light-line 22 determined by the length of the active part of that line, in other words, by the shape of the aperture in the mask 25 and the location of the light-line in that aperture. This location is, in its turn, dependent on the transmissive power of the corresponding point on the image 1 of the original negative (Fig. 3).

It will be clear that by means of an appropriate construction of the limiting curve, the active part of the screen or mask can be adjusted very precisely to the shape of the transmission-curves of the photographic material in question, and that in this way one can obtain at will a corrected positive or negative reproduction of an originally positive as well as of an originally negative image. It is even possible by a suitable construction of the limiting curve mentioned to apply a "super"-correction in reproducing an image, in such a way that not only the transmission-curves of the material of the original and the reproduction are duly taken into account, but also the curve of still one more sensitive material, so that a direct reproduction, for example by optical projection or by contact-printing of a super-corrected negative will furnish at once a transparency with the correct gradations. If required, any number of further characteristics can be taken into account in the application of the supercorrection.

In the case of an oscillograph-adjuster one can comply in a simple way with the various requirements (as regards transmission-curves and supercorrection) by making the entire surface of the screen reflecting and by then screening or masking off any arbitrary part of it by means of a number of non-reflecting closely fitting flat rods or of slanting mirrors, these rods or mirrors being capable of an up- and down-motion.

Since, therefore, the positions of these rods or mirrors can be altered at will, one can give to the reflecting part of the screen any shape that may be required. A similar construction can be applied to the Braun-tube adjuster.

When a simple black and white image is transmitted, for example by telegraph, it is, generally speaking, not necessary to obtain accurately the correct gradations. In this case, therefore, it is sufficient to limit the active part of the screen by straight lines.

What I claim is:

1. In a compensated electro-optical photographic printing apparatus, an original image, a sensitive photographic plate of determined photographic characteristics, electro-optical transmitting means for scanning said original image and translating successive points of said image into a corresponding instantaneous electric-current, voltage-responsive electro-optical receiving light source means adapted to direct a linear beam of light selectively in directions which vary continuously with the voltage applied to said receiving means from said transmitting means, optical mask means interposed in the path of said linear beam, and means for impressing on said photographic plate a point image in scanning relation synchronized with said transmitting means corresponding to said linear beam after translation by said mask means, said mask means having an optically active surface of a configuration extending lengthwise to intercept all positions of said linear beam and of length in the direction of the width of said linear beam at a given point lengthwise of said mask means which varies according to the deviation from linearity of the characteristic curves of the sensitive layers of the used negative and positive photographic material showing the relation of transmission power after development to incident light, and, if necessary, also according to the deviation from linearity of the characteristic curves of the electro-optical means showing the relation of the output to the input energy.

2. An apparatus according to claim 1, the width of said optically active surface of said mask means varying as the deviation from linearity of the composite characteristic curve of said first mentioned sensitive plate and of a secondary sensitive plate printed optically from said first mentioned developed plate showing the relation of transmission power of said secondary plate after development to light incident on said first mentioned plate.

3. An apparatus according to claim 1, said receiving means comprising an electro-mechanical oscillograph carrying a mirror, and said mask means comprising a cylindrical mirror whose reflecting surface is contoured in accordance with said characteristic curve.

4. An apparatus according to claim 1, said receiving means comprising a cathode-ray oscillograph adapted to produce a varying linear beam, and said mask means being interposed on the output side of the light sensitive screen of said cathode-ray oscillograph.

5. An apparatus according to claim 1, said receiving means comprising a cathode-ray oscillograph adapted to produce a varying linear beam and further comprising electro-optical light valve means adapted to electro-optically translate a point image of light incident thereon into a point of light incident on said sensitive plate, and said mask means being interposed between the light-sensitive screen of said cathode-ray oscillograph and said light valve means.

6. An arrangement for the production of images, particularly for the improved reproduction of objects in their true colors, comprising means for scanning a single photographic image of the object point for point, a photoelectric cell for receiving the light let through during scanning, adjusting means controlled by said photoelectric cell comprising a source of light and adapted to instantaneously supply for any input quantity of light let through said scanner a predetermined quantity of output light which varies according to the transmission curves of the photographic material showing power of transmission of the developed photographic sensitive layers used as a function of intensity of light incident thereon before development, and means operated by said adjusting means for illuminating a sensitive layer.

7. A process for the production of images particularly for the improved reproduction of objects in their true colors, employing a scanner, a photoelectric cell, an adjusting regulating arrangement cooperating with said cell and comprising a source of light and adapted to instantaneously supply for any input quantity of light let through said scanner a predetermined quantity of output light, consisting in scanning point for point separately a selected one of a set of complementary photographic images of the object corresponding to a set of primary colors, and applying the varying quantities of light let through during scanning for controlling said regulating arrangement by said photoelectric cell, varying the ratio of said input and output quantities of light with the input quantity of light in accordance with the transmission curves of the photographic sensitive material showing power of transmission of a positive made from an original negative as a function of intensity of light incident on the subject in making the original negative, and exposing a sensitive layer to the output energy of said regulating arrangement.

8. In photographic reproduction to produce a corrected positive plate using sensitive layers on negative and positive plates, the method of faithful corrected reproduction which consists in producing a negative, scanning said negative point by point and translating optical point values into instantaneous electrical voltages, varying the breadth of a uniform linear light beam with the successive values of said instantaneous voltages according to the composite transmission curves of the photographic sensitive layers used showing quantity of light transmitted through a positive as a function of quantity of light incident on the original negative from which said positive was made, concentrating said varied linear beam into a point image, and impressing said point image on a sensitive plate in scanning relation synchronized with the scanning of said negative.

9. In photographic reproduction to produce from a primary photographic plate of an original subject a super-corrected secondary plate capable by contact printing of producing a faithful tertiary reproduction of the original subject, using sensitive layers on all plates, the method of faithful corrected reproduction which consists in scanning said primary plate point by point and translating optical point values into instantaneous electrical voltages, varying the breadth of a uniform linear light beam with the successive values of said instantaneous voltages according to the composite transmission curves of the photographic sensitive layers used showing quantity of light transmitted through a third plate printed from an intermediate second plate as a function of quantity of light incident on a first plate from which said second plate was made, concentrating said varied linear beam into a point image, and impressing said point image on a sensitive plate in scanning relation synchronized with the scanning of said primary plate, to produce said super-corrected secondary plate.

10. In photographic color reproduction using three color separation to produce a set of corrected complementary positive plates using sensitive layers on negative and positive plates, the method of faithful corrected reproduction which consists in scanning point for point separately a selected one of a set of complementary negatives made from the object corresponding to a set of primary colors and translating optical point values into instantaneous electrical voltages, varying the breadth of a uniform linear light beam with the successive values of said instantaneous voltages according to the composite transmission curves of the photographic sensitive layers used showing quantity of light transmitted through a positive as a function of quantity of light incident on the original negative from which said positive was made, concentrating said linear beam into a point image, impressing said point image on a sensitive plate in scanning relation synchronized with the scanning of said negative to produce one of a set of corrected complementary positives, and repeating the steps for the other complementary colors.

11. In photographic reproduction to produce a corrected positive plate using sensitive layers on negative and positive plates, the method of faithful corrected reproduction which consists in producing a negative, scanning said negative point by point and translating optical point values into instantaneous electrical voltages, varying the angular direction of a uniform linear light beam perpendicular to its breadth in accordance with the successive values of said instantaneous voltages, reflecting a fraction of the breadth of said linear beam which varies in magnitude as a function of its said angular direction according to the composite transmission curves of the photographic sensitive layers used showing quantity of light transmitted through a positive as a function of quantity of light incident on the original negative from which said positive was made, concentrating the so modified reflected beam into a point image, and impressing said point image on a sensitive plate in scanning relation synchronized with the scanning of said negative.

12. In photographic reproduction to produce a corrected positive plate using sensitive layers on negative and positive plates, the method of faithful corrected reproduction which consists in producing a negative, scanning said negative point by point and translating optical point values into instantaneous electrical voltages, varying the angular direction of a uniform linear light beam perpendicular to its breadth in accordance with the successive values of said instantaneous voltages, transmitting a fraction of the breadth of said linear beam which varies in magnitude as a function of its said angular direction according to the composite transmission curves of the photographic sensitive layers used showing quantity of light transmitted through a positive as a function of quantity of light incident on the original negative from which said positive was made, and impressing a point image corresponding to the integrated concentrated quantity of light in the so modified transmitted linear beam on a sensitive plate in scanning relation synchronized with the scanning of said negative.

PIETER KREMER.